US009547842B2

(12) United States Patent
De la Rosa et al.

(10) Patent No.: US 9,547,842 B2
(45) Date of Patent: Jan. 17, 2017

(54) OUT-OF-OFFICE ELECTRONIC MAIL MESSAGING SYSTEM (75) Inventors: Jan De la Rosa, Austin, TX (US); Salil P. Gandhi, Pune (IN); Saidas T. Kottawar, Pune (IN); Sandip D. Mahajan, Pune (IN)

(73) Assignee: International Business Machines Corporation, Armonk, NY (US)

( * ) Notice: Subject to any disclaimer, the term of this patent is extended or adjusted under 35 U.S.C. 154(b) by 2042 days.

(21) Appl. No.: 12/686,469

(22) Filed: Jan. 13, 2010

(65) Prior Publication Data

US 2011/0173271 A1   Jul. 14, 2011

(51) Int. Cl.
*G06F 15/16* (2006.01)
*G06Q 10/10* (2012.01)
*H04L 12/58* (2006.01)

(52) U.S. Cl.
CPC ......... *G06Q 10/107* (2013.01); *H04L 12/5855* (2013.01); *H04L 51/14* (2013.01)

(58) Field of Classification Search
USPC ........................................................ 709/206
See application file for complete search history.

(56) References Cited

U.S. PATENT DOCUMENTS

| 6,640,230 | B1* | 10/2003 | Alexander et al. | |
|---|---|---|---|---|
| 7,551,727 | B2* | 6/2009 | Howell et al. | 379/88.14 |
| 8,166,121 | B2* | 4/2012 | Farrell et al. | 709/206 |
| 8,230,030 | B2* | 7/2012 | Cummings | 709/206 |
| 2005/0066005 | A1* | 3/2005 | Paul | 709/206 |
| 2005/0288987 | A1* | 12/2005 | Sattler et al. | 705/9 |
| 2006/0031326 | A1* | 2/2006 | Ovenden | 709/206 |
| 2006/0083358 | A1* | 4/2006 | Fong et al. | 379/88.13 |
| 2007/0071209 | A1* | 3/2007 | Horvitz et al. | 379/201.06 |
| 2007/0192678 | A1 | 8/2007 | Tang et al. | |
| 2008/0040177 | A1 | 2/2008 | Vuong et al. | |
| 2008/0104175 | A1 | 5/2008 | Keohane et al. | |
| 2008/0104177 | A1 | 5/2008 | Keohane et al. | |
| 2008/0112546 | A1 | 5/2008 | Fletcher et al. | |
| 2008/0127231 | A1 | 5/2008 | Shaffer et al. | |
| 2008/0133302 | A1 | 6/2008 | Brauninger et al. | |

(Continued)

FOREIGN PATENT DOCUMENTS

WO    2007094821 A1    8/2007

*Primary Examiner* — Ario Etienne
*Assistant Examiner* — Blake Rubin
(74) *Attorney, Agent, or Firm* — Schmeiser, Olsen & Watts, LLP; John Pivnichny (57) ABSTRACT A method, a system and a computer program product of transmitting availability information in an electronic mail system are disclosed. The system includes a first system including a sender, the first system is adapted to activate an availability indicator having a start date, wherein the activation is performed by the sender and extract availability indicator metadata from the availability indicator. The availability indicator metadata includes the start date, an end date, and at least one availability indicator message. If an e-mail has not been sent to a receiver since activation and if a current date is prior to the start date, the first system is further adapted to attach the availability indicator metadata to the e-mail, and send the e-mail to the receiver. The electronic mail system further includes a scheduling system functionally coupled to the first system, and is adapted to define the availability indicator.

20 Claims, 7 Drawing Sheets (56) References Cited

U.S. PATENT DOCUMENTS

2009/0077183 A1* 3/2009 Bruce et al. ................. 709/206
2009/0307232 A1* 12/2009 Hall .............................. 707/10
2010/0146059 A1* 6/2010 DellaFera et al. ........... 709/206

* cited by examiner

OUT-OF-OFFICE ELECTRONIC MAIL MESSAGING SYSTEM

BACKGROUND OF THE INVENTION

The electronic workplace facilitates collaboration in enterprises, both within and with the outside entities. An electronic mail system is one of the tools included in the electronic workplace. In addition to sending e-mail, there are many other features and tools that the electronic mail system provides. Out of office is an optional feature provided by many of the popular electronic mail systems, especially by POP3 (Post Office Protocol) electronic mail system. POP3 is a version of the POP standard.

In computing, the POP is an application-layer Internet standard protocol used by local e-mail clients to retrieve e-mail from a remote server over a TCP/IP connection. POP and IMAP (Internet Message Access Protocol) are the two most prevalent Internet standard protocols for e-mail retrieval. Virtually all modern e-mail clients and servers support both.

When the out of office agent is enabled, it automatically responds to e-mail that arrives when the user is out of the office. While configuring the agent, the user can specify the text of the message, and set rules on who should receive the special alert messages or who should not receive the alert messages. The out of office agent also provides an option to mark the user's calendar "busy" for the time he/she is away. The agent generates automatic alert messages once for each person who sends e-mail to the user, even if the person sends several messages during the user's absence.

SUMMARY OF THE INVENTION

The embodiments of the invention disclose a method, a system and a computer program product of transmitting availability information in an electronic mail system.

Embodiments of the invention include an electronic mail system, the system including a first system including a sender, the first system is adapted to activate an availability indicator having a start date, wherein the activation is performed by the sender and to extract availability indicator metadata from the availability indicator.

If an e-mail has not been sent to a receiver since activation and if a current date is prior to the start date, the first system is further adapted to attach the availability indicator metadata to the e-mail, and send the e-mail to the receiver.

Another embodiment of the invention discloses a method of transmitting availability information in an electronic mail system, the method comprising the steps of providing a first system including a sender, the first system, activating an availability indicator having a start date, activated by the sender, the first system for extracting availability indicator metadata from the availability indicator, and if an e-mail has not been sent to a receiver since the activation and if a current date is prior to the start date, attaching the availability indicator metadata to the e-mail, and sending the e-mail to the receiver.

Yet another embodiment of the invention discloses a storage medium tangibly embodying a program of machine-readable instructions executable by a digital processing apparatus to carry out a method of transmitting availability information in an electronic mail system, the storage medium configured to provide a first system including a sender, the first system adapted to activate an availability indicator having a start date wherein the activation is performed by the sender, extract availability indicator metadata from the availability indicator, and if an e-mail has not been sent to a receiver since activation and if a current date is prior to the start date, attach the availability indicator metadata to the e-mail, and send the e-mail to the receiver.

Still yet another embodiment of the invention discloses a computer system for electronic mail, the system comprising a CPU, a computer readable memory and a computer readable storage medium, a sender, first program instructions to activate an availability indicator having a start date, wherein the activation is performed by the sender, second program instructions to extract availability indicator metadata from the availability indicator, and if an e-mail has not been sent to a receiver since activation and if a current date is prior to the start date, to attach the availability indicator metadata to the e-mail, and to send the e-mail to the receiver, wherein the first and second program instructions are stored on the computer readable storage medium by the CPU for execution by the CPU via the computer readable memory.

Yet still another embodiment of the invention discloses a computer system for electronic mail, the system comprising a CPU, a computer readable memory, and a computer readable storage medium, a receiver, first program instructions to receive an e-mail from another computer system, second program instructions to extract availability indicator metadata from the received e-mail, the availability indicator metadata including a start date, an end date, and at least one availability indicator message, third program instructions to store the availability indicator metadata, fourth program instructions to compare the current date with the start date, and fifth program instructions to notify the receiver if the current date matches with the start date, the notifying performed using a start date graphical user interface, wherein the first, second, third, fourth and fifth program instructions are stored on the computer readable storage medium for execution by the CPU via the computer readable memory.

BRIEF DESCRIPTION OF THE DRAWINGS

Embodiments of the invention are described in detail below, by way of example only, with reference to the following schematic drawings, where.

DETAILED DESCRIPTION OF THE INVENTION

Embodiments of the invention describe, in an example embodiment, transmitting availability information in an electronic mail system. An example of availability information is that of an "out of office" message. In an exemplary mode, one embodiment of the invention enables transmitting availability of a user or unavailability of a user in advance of the occurrence related to the availability event.

Embodiments of the invention, in an exemplary mode, relate to out of office assistants that provide user friendly methods and systems for scheduling and customizing out of office messages. An exemplary availability indicator is an out of office indicator. An out of office message typically is a message, such as an e-mail message, which is sent in reply to a received message, and which alerts the sender of the received message that the recipient is "out of the office". In a typical "out of office" setting, a person sets a start date "date1" and an end date "date2" for the time period that the person is going to be out of office and an appropriate message could also included. A message may read, as an example: "I will be out of office from date1 to date 2; please contact person B as my backup". The out of office settings could be performed using an e-mail client or a vacation planner, or a leave processing database.

Figure 1:
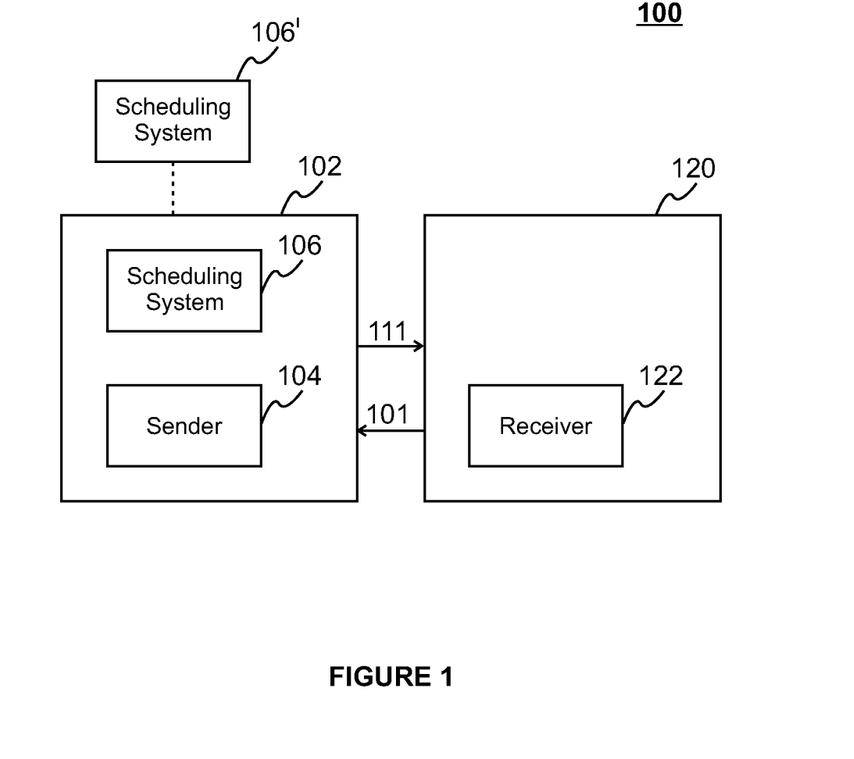
FIG. 1 shows a schematic of transmitting availability information in a typical electronic mail.

FIG. 1 shows schematic 100 of transmitting availability information in a typical electronic mail system. Schematic 100 includes a first system 102 including a sender 104. Schematic 100 further includes a second system 120 including a receiver 122. Schematic 100 further includes a scheduling system 106 which could be included in first system 102 or it could also be functionally coupled to first system 102 as shown by a dotted line, and the scheduling system being represented by 106'.

In an exemplary mode, it is assumed that sender 104 of first system 102 is going to be unavailable from a start date "date1" till an end date "date2" and a corresponding "availability indicator message", such as, for example, "I am on vacation from "date1" to "date2" and I will respond to your e-mails after date2" has been set by sender 104. When receiver 122 included in second system 120 sends an e-mail to sender 104 via link 101, during a date between "date1" and ["date2"-1], first system 102 recognizes that an out of office message needs to be sent to second system 120. The out of office message as an e-mail is sent by sender 104 to receiver 122 via link 111.

Figure 2:
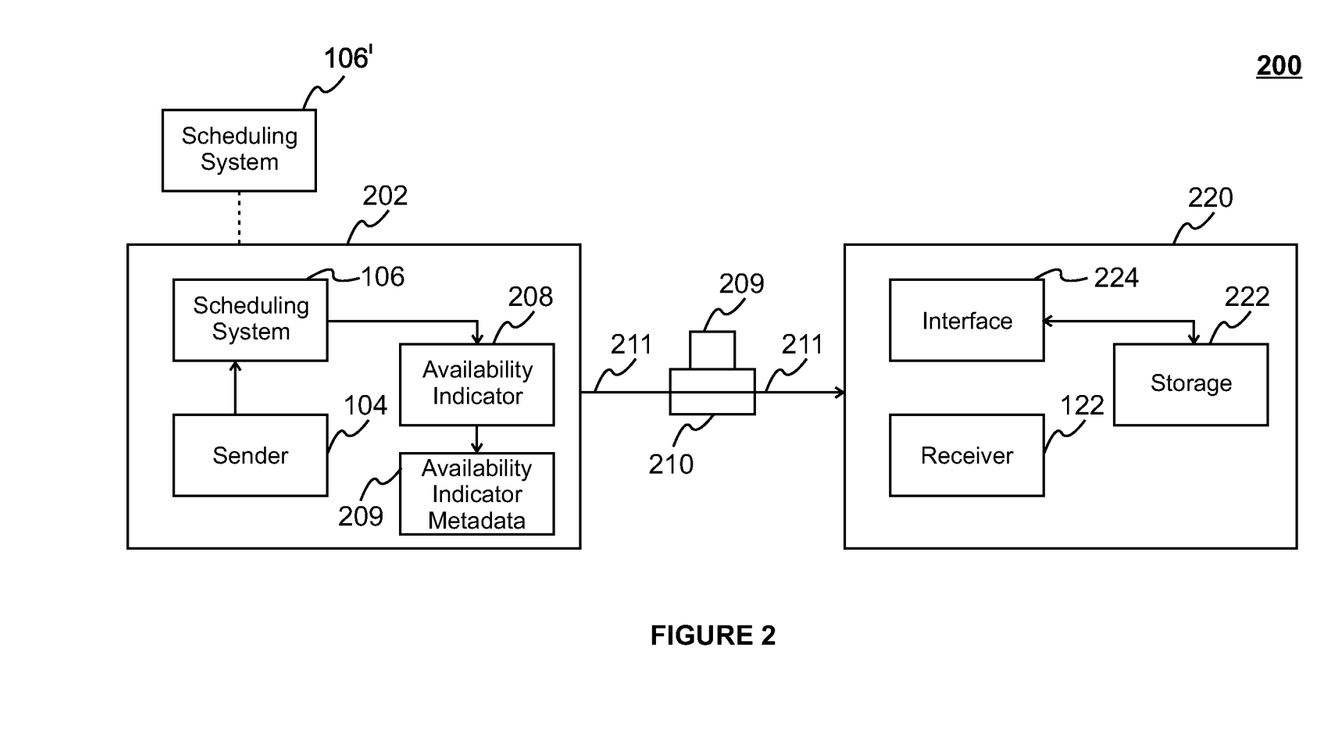
FIG. 2 depicts a high-level schematic illustrating a system for transmitting availability information in an electronic mail system according to an example embodiment of the invention.

FIG. 2 depicts a high-level schematic 200 illustrating a system for transmitting availability information in an electronic mail system according to an example of an embodiment of the invention. Schematic 200 of the electronic mail system includes a first system 202 including sender 104. Schematic 200 further includes a second system 220 including receiver 122. Second system 220 can be communicatively coupled to first system 202. Furthermore first system 202 and second system 220 can be independent systems and can be computer systems for processing electronic mail. Receiver 122 is selected from the group consisting of at least a single recipient and a group of recipients. The second system includes a storage 222 and a notification date setting graphical user interface 224. Notification date setting graphical user interface 224 can also include a start date or end date graphical user interface.

Schematic 200 further includes scheduling system 106 which could be included in first system 202 or it could also be functionally coupled to the first system, as shown by 106' and coupled to the first system as shown by a dotted line.

First system 202 is adapted to activate an availability indicator 208 having a start date, wherein sender 104 performs activation. Availability indicator metadata 209 includes the start date, an end date and at least one availability indicator message. Scheduling system 106 is adapted to define availability indicator 208, and scheduling system 106 or 106' is selected from the group consisting of one or more of an e-mail system, a calendar system, a vacation planner and a leave processing system. Sender 104 uses scheduling system 106 to define availability indicator 208. First system 202 is further adapted to extract availability indicator metadata 209 from availability indicator 208. If an e-mail 210 has not been sent to receiver 122 since activation and if a current date is prior to the start date, first system 202 is adapted to further attach availability indicator metadata 209 to e-mail 210 and send e-mail 210 to receiver 122 via link 211.

Second system 220 is adapted to receive e-mail 210 via link 211 from first system 202 and extract availability indicator metadata 209 from received e-mail 210, and store availability indicator metadata 209. Second system 220 is adapted to store availability indicator metadata 209 using storage 222. Storage 222 is selected from the group consisting of a memory, a server, a file system repository, and a relational database system repository.

Second system 220 is further adapted to compare the current date with the start date, and notify receiver 122, if the current date matches with the start date. A start date graphical user interface (see FIG. 4) performs the notification. The start date graphical user interface includes a start date set of actions, wherein second system 220 is adapted to perform at least one action selected from the start date set of actions.

Second system 220 is further adapted to compare the current date with the end date, and notify receiver 122, if the current date matches with the end date. An end date graphical user interface (similar to a start date graphical user interface of FIG. 4, and will be described later) performs the notification. The end date graphical user interface includes an end date set of actions, wherein second system 220 is adapted to perform at least one action selected from the end date set of actions.

Second system 220 is further adapted to configure notification date setting graphical user interface 224 used by receiver 122 to set a notification date. The notification date is a pre-determined date set in response to a date selected from the group consisting of the start date and the end date. Second system 220 is further adapted to compare the current date with the notification date, and notify receiver 122, if the current date matches with the notification date. The notification date graphical user interface (similar to a start date graphical user interface of FIG. 4, and will be described later) performs the notification. The notification date graphical user interface includes a notification date set of actions, wherein second system 220 is adapted to perform at least one action selected from the notification date set of actions.

Figure 3:
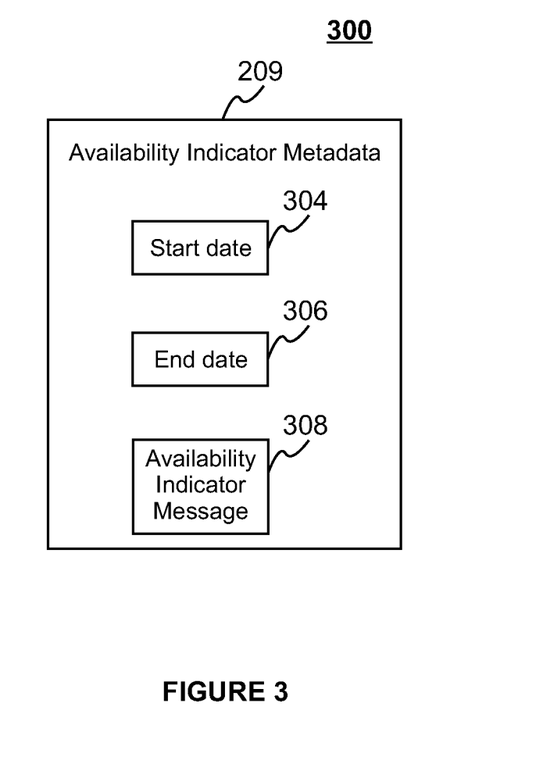
FIG. 3 depicts details of the exemplary availability indicator metadata as shown in FIG. 2.

FIG. 3 depicts a schematic 300 of the exemplary availability indicator metadata 209 as shown in FIG. 2. Schematic 300 depicts details of exemplary availability indicator metadata 209. Exemplary availability indicator metadata 209 includes a start date 304, an end date 306 and an availability indicator message 308.

Figure 4:
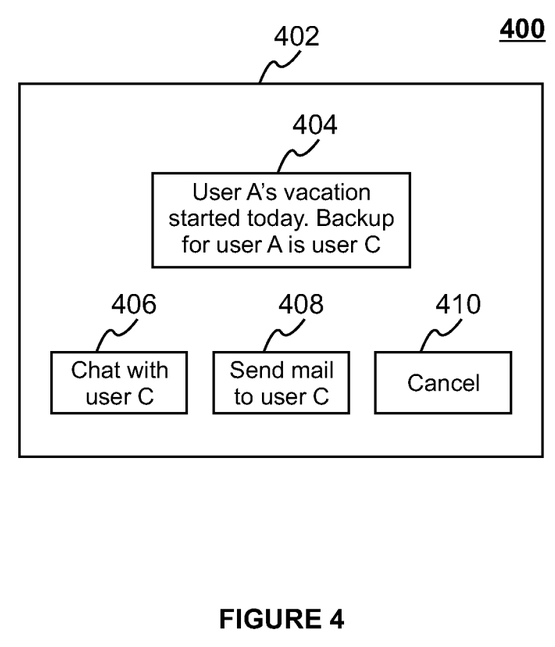
FIG. 4 shows an exemplary start date graphical user interface as shown in FIG. 2.

FIG. 4 shows a schematic 400 of an exemplary start date graphical user interface 402 as discussed in FIG. 2. A start date graphical user interface 402, in turn depicts details of start date graphical user interface 402. It should be obvious to one skilled in the art that various other graphical user interfaces can be included in this group. For example, graphical user interface depicted as 402 can also be similarly applicable to an end date graphical user interface or notification date graphical user interface. A message associated with the start date is shown in 404. It reads as "User A's vacation started today. Backup for user A is user C".

Graphical user interface 402 can also include a start date set of actions. An action to "chat with user C" is shown in 406. An action to "send e-mail to user C" is depicted in 408. A "cancel" action is shown in 410.

Figure 5:
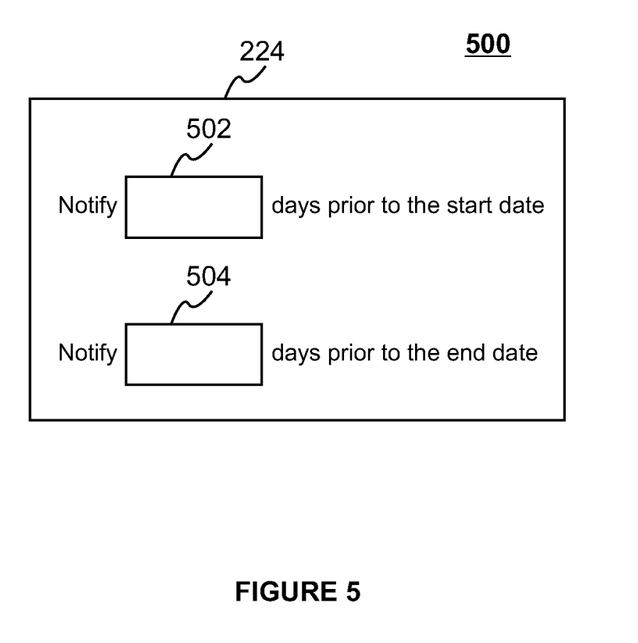
FIG. 5 shows details of the exemplary notification date setting graphical user interface as shown in FIG. 2.

FIG. 5 shows a schematic 500 showing details of exemplary notification date setting graphical user interface 224 as shown in FIG. 2. Exemplary notification setting graphical user interface 224 shows two fields 502 and 504. Field 502 is used to set the notification to a number of days prior to the start date 304 of FIG. 3. Field 504 is used to set the notification to a number of days prior to end date 306 of FIG. 3.

Figure 6:
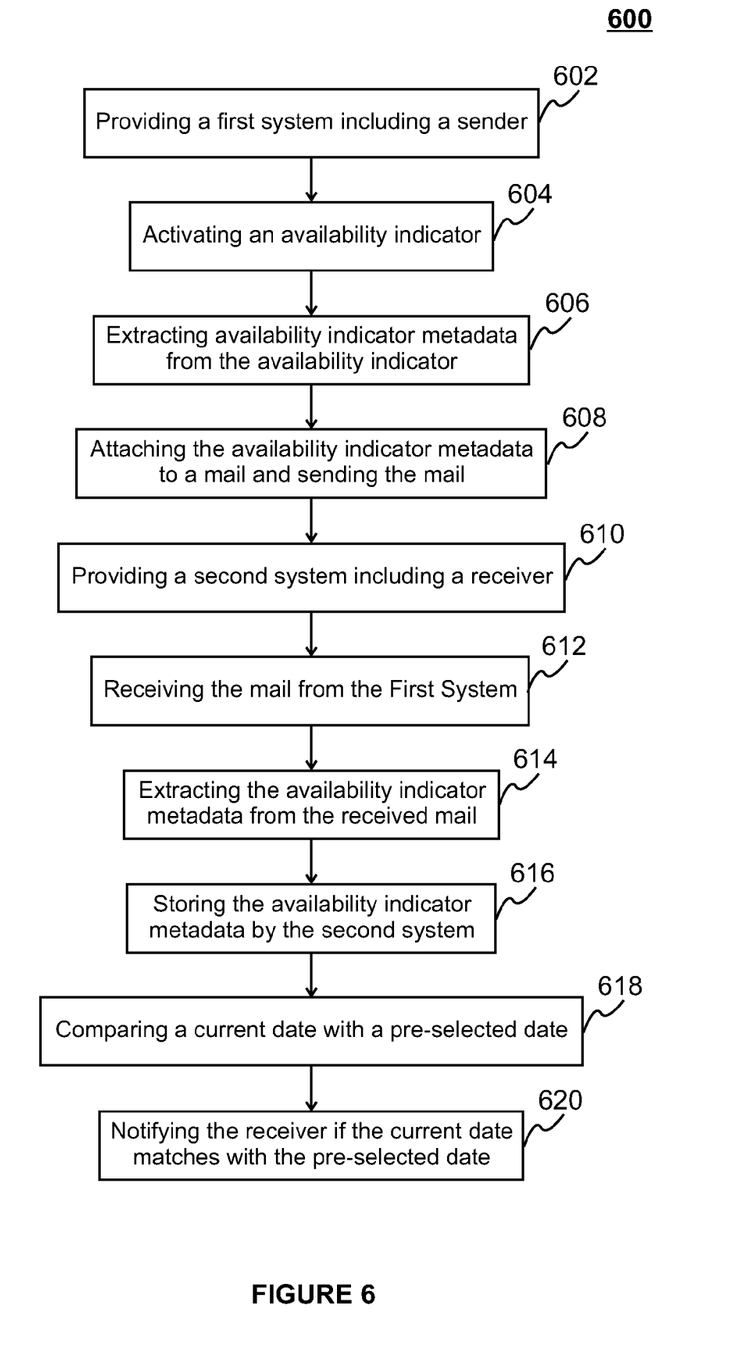
FIG. 6 shows a flow chart for transmitting availability information in an electronic mail system in accordance with FIG. 2.

FIG. 6 shows a flow chart 600 for the method of transmitting availability information in accordance with the electronic mail system of FIG. 2. Step 602 depicts providing a first system including a sender. Step 604 depicts the first system, activating an availability indicator having a start date, activated by the sender. Step 606 shows the first system extracting availability indicator metadata from the availability indicator. If an e-mail has not been sent to a receiver since the activation and if a current date is prior to the start date, step 608 depicts the first system attaching the availability indicator metadata to the e-mail, and sending the e-mail to the receiver.

Step 610 depicts providing a second system including the receiver. Step 612 shows the second system receiving the e-mail from the first system. The second system extracting the availability indicator metadata from the received e-mail, wherein the availability indicator metadata includes the start date, an end date, and at least one availability indicator message, is depicted in step 614. Step 616 depicts storing the availability indicator metadata. Step 618 depicts comparing the current date with a pre-selected date, wherein the pre-selected date is selected from the group consisting of the start date, the end date, a date in response to the start date, and a date in response to the end date. Step 620 depicts notifying the receiver, if the current date matches with the preselected date, the notifying being performed using a pre-selected date graphical user interface, the comparing and the notifying steps being performed by the second system.

In an exemplary mode, in one embodiment of the method of transmitting availability information in an electronic mail system, there are four users: user A, user B, user C and user D. User A is the sender of the e-mail. When the sender, user A, plans a vacation, user A sets the availability information, as an example, an "Out of Office" (OOO) setting. User A can set this up using any scheduling system selected from one or more of a set that includes an OOO setting, a vacation planner, an e-mail system, a calendar system, or a vacation planner. The exemplary scheduling system may or may not reside on the same server that includes the mail system.

After setting the OOO information, whenever user A sends an e-mail to any other user/group of users (hereafter called receiver), in an exemplary mode, an agent/service will run in the background that will check for the OOO information of the sender. The agent will fetch user A's OOO information from the scheduling system, extract OOO meta information, such as, for example, a start date, an end date and an OOO message and attach this OOO meta information to the e-mail that user A is sending. The agent will send this OOO meta information only once to each receiver.

In an exemplary mode, user A sends the e-mails to two receivers: user B, and user C. User D is a backup of user A. In case of user B, when user B receives the e-mail from user A, the OOO meta information from the received e-mail is extracted and stored in either on the machine of the user B or on a server or in a repository. The repository can be a file system or a relational database. The system of user B further keeps checking whether user A's vacation has started or not. If user A's vacation start date matches with the current date, the agent will display a pop-up on user B system indicating that user A is on vacation from that date. The exemplary receiver, user B, will get an alert reading "User A's vacation started today. For any project related issues, please get in touch with user D". The pop-up window will also provide user with the "Chat" and "Send mail" options to contact user D. Similarly when user A returns from the vacation, the agent will display a pop-up message indicating that user A is back from vacation.

Additionally, the receiver may have the facility to configure a pop-up display before the sender goes on vacation, if receiver wants an alert. In an exemplary mode, user C wishes to have an alert two days prior to the sender going on vacation. User C's system will display OOO pop-up message when two days remain to the start date of user A's vacation. An exemplary pop-up message may be: "Two days remain until user A's vacation to begins. Please finish the pending activities". The pop-up window may also provide user C with the "Chat" and "Send mail" options to contact user A or a backup, as an example, user D, designated by the user A. This enables the receiver to manage workload and activities efficiently.

Figure 7:
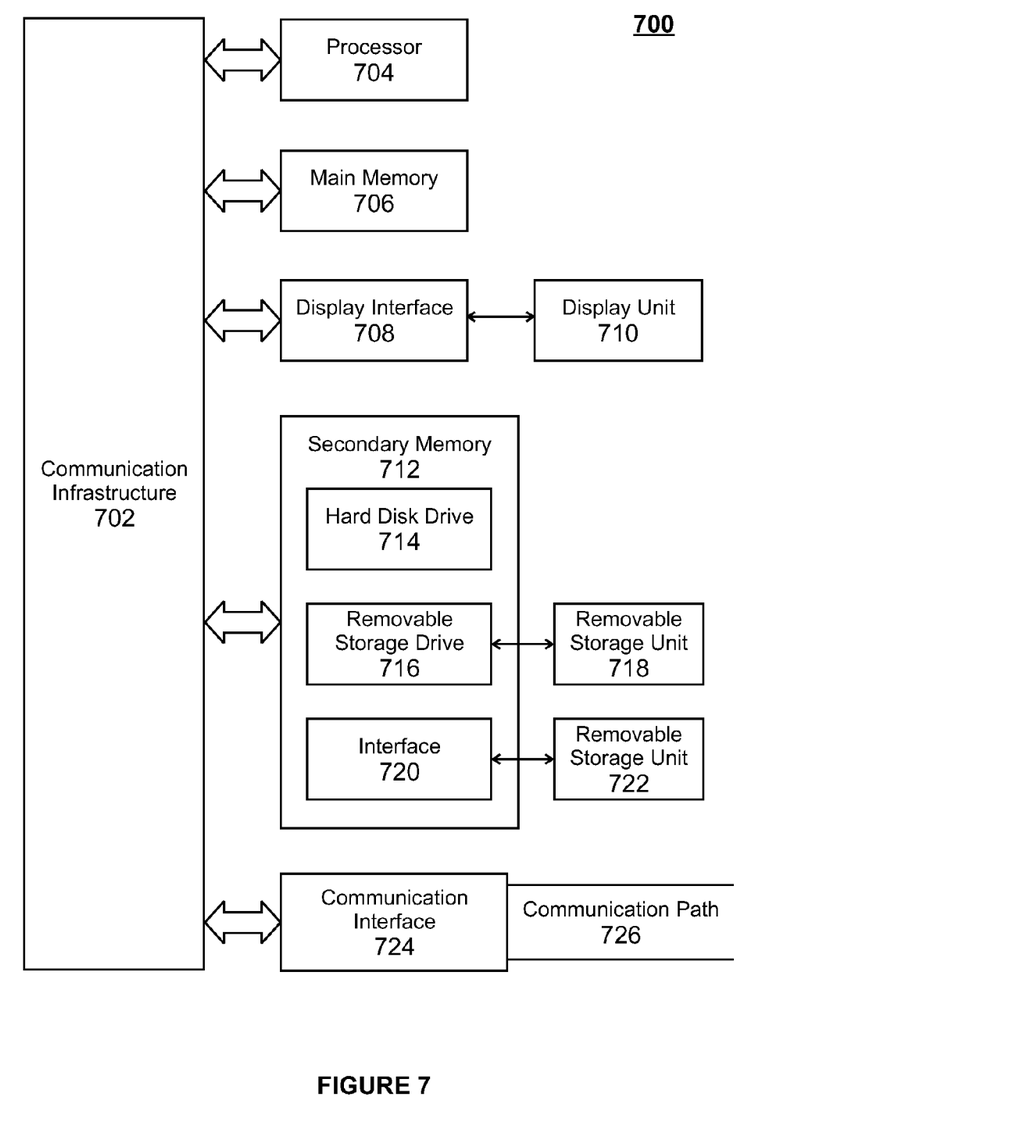
FIG. 7 illustrates an exemplary embodiment of a computer system used for transmitting availability information in an electronic mail system in accordance with a system as shown in FIG. 2.

FIG. 7 illustrates an exemplary embodiment of a computer system used for transmitting availability information in an electronic mail system in accordance with the system as shown in FIG. 2. A computer system 700 can also be used to perform the steps described in FIG. 6. The computer system 700 can also be used to implement the second system 120. The computer system 700 includes a processor (CPU) 704. It should be understood although FIG. 7 illustrates a single processor, one skilled in the art would appreciate that more than one processor can be included as needed. Processor 704 is connected to a communication infrastructure 702 (for example, a communications bus, cross-over bar, or network) where the communication infrastructure is configured to facilitate communication between various elements of exemplary computer system 700. Various software embodiments are described in terms of this exemplary computer system. After reading this description, it will become apparent to a person of ordinary skill in the relevant art(s) how to implement the invention using other computer systems and/or computer architectures.

Exemplary computer system 700 can include a display interface 708 configured to forward graphics, text, and other data from communication infrastructure 702 (or from a frame buffer not shown) for display on a display unit 710. Computer system 700 also includes a main memory 706, which can be random access memory (RAM), and may also include a secondary memory 712. Secondary memory 712 may include, for example, a hard disk drive 714 and/or a removable storage drive 716, representing a floppy disk drive, a magnetic tape drive, an optical disk drive, etc. Removable storage drive 716 reads from and/or writes to a removable storage unit 718 in a manner well known to those having ordinary skill in the art. Removable storage unit 718, represents, for example, a floppy disk, magnetic tape, optical disk, etc. which is read by and written to by removable storage drive 716. As will be appreciated, removable storage unit 718 includes a computer usable storage medium having stored therein computer software and/or data.

In exemplary embodiments, secondary memory 712 may include other similar means for allowing computer programs or other instructions to be loaded into the computer system. Such means may include, for example, a removable storage unit 722 and an interface 720. Examples of such may include a program cartridge and cartridge interface (such as that found in video game devices), a removable memory chip (such as an EPROM, or PROM) and associated socket, and other removable storage units and interfaces which allow software and data to be transferred from removable storage unit 722 to computer system 700.

Computer system 700 may also include a communications interface 724. Communications interface 724 allows software and data to be transferred between the computer system and external devices. Examples of communications interface 724 may include a modem, a network interface (such as an Ethernet card), a communications port, a PCM-CIA slot and card, etc. Software and data transferred via communications interface 724 are in the form of signals which may be, for example, electronic, electromagnetic, optical, or other signals capable of being received by the communications interface. These signals are provided to communications interface 724 via a communications path (that is, channel) 726. Channel 726 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 706 and secondary memory 712, removable storage drive 716, a hard disk installed in hard disk drive 714, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in main memory 706 and/or secondary memory 712. Computer programs may also be received via communications interface 724. Such computer programs, when executed, can enable the computer system to perform the features of exemplary embodiments of the present invention as discussed herein. In particular, the computer programs, when executed, enable processor 704 to perform the features of computer system 700. Accordingly, such computer programs represent controllers of the computer system.

Embodiments of the invention further provide a storage medium tangibly embodying a program of machine-readable instructions executable by a digital processing apparatus to carry out a method of transmitting availability information in an electronic mail system as described in the various embodiments set forth above and described in detail.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects such as logic memory or any combination thereof that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIGS. 2-7, the flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

Although exemplary embodiments of the invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A method for transmitting availability information in an electronic mail system, said method comprising:

receiving, by a first processor of a first system from a user of the first system on a date prior to a start date, a notification that the user is unavailable from the start date to an end date;

in response to said receiving the notification, said first processor activating an availability indicator in the first system, wherein the availability indicator indicates that the user is unavailable from the start date to the end date;

said first processor extracting availability indicator metadata from the availability indicator, wherein the availability indicator metadata comprises the start date, the end date and an availability indicator message pertaining to the user being unavailable from the start date to the end date;

said first processor determining that an e-mail has not been sent from the first system to a receiver in a second system linked to the first system since said activating;

said processor ascertaining whether a current date is prior to the start date and determining, from said ascertaining, that the current date is prior to the start date;

in response to said determining that the current date is prior to the start date and to said determining that the e-mail has not been sent from the first system to the receiver in the second system, said first processor attaching the extracted availability indicator metadata to the e-mail; and said first processor sending the e-mail with the attached availability indicator metadata to the receiver in the second system.

2. The method of claim 1, said method further comprising receiving, by a second processor of a second system, the e-mail with the attached availability indicator metadata sent by the first processor of the first system;

said second processor extracting the availability indicator metadata from the received e-mail; and said second processor storing the availability indicator metadata.

3. The method of claim 2, said method further comprising:

said second processor comparing the current date with a pre-selected date, wherein the pre-selected date is selected from the group consisting of the start date, the end date, a date in response to the start date, and a date in response to the end date;

said second processor determining from said comparing that the current date matches the preselected date; and in response to said determining that the current date matches the preselected date, said second processor notifying the receiver that the current date matches the preselected date, said notifying being performed using a pre-selected date graphical user interface.

4. The method of claim 1, said method further comprising:

defining the availability indicator, said defining being performed by a vacation planner through use of the first processor.

5. The method of claim 3, wherein the pre-selected date is the start date.

6. The method of claim 3, wherein the pre-selected date is the end date.

7. The method of claim 3, wherein the pre-selected date is the date in response to the start date.

8. The method of claim 3, wherein the pre-selected date is the date in response to the end date.

9. A computer system comprising a first system that comprises a first processor, a first memory coupled to the first processor, and a first computer readable storage device coupled to the first processor, said first computer readable storage device containing first program code configured to be executed by the first processor via the first memory to implement a method for transmitting availability information in an electronic mail system, said method comprising:

receiving, by the first processor of the first system from a user of the first system on a date prior to a start date, a notification that the user is unavailable from the start date to an end date;

in response to said receiving the notification, said first processor activating an availability indicator in the first system, wherein the availability indicator indicates that the user is unavailable from the start date to the end date;

said first processor extracting availability indicator metadata from the availability indicator, wherein the availability indicator metadata comprises the start date, the end date and an availability indicator message pertaining to the user being unavailable from the start date to the end date;

said first processor determining that an e-mail has not been sent from the first system to a receiver in a second system linked to the first system since said activating;

said processor ascertaining whether a current date is prior to the start date and determining, from said ascertaining, that the current date is prior to the start date;

in response to said determining that the current date is prior to the start date and to said determining that the e-mail has not been sent from the first system to the receiver in the second system, said first processor attaching the extracted availability indicator metadata to the e-mail; and said first processor sending the e-mail with the attached availability indicator metadata to the receiver in the second system.

10. The computer system of claim 9, said computer system further comprising the second system, said second system comprising a second processor, a second memory coupled to the second processor, and a second computer readable storage device coupled to the second processor, said second computer readable storage device containing second program code configured to be executed by the second processor via the second memory to further implement said method for transmitting availability information, said method further comprising:

said second processor receiving the e-mail with the attached availability indicator metadata sent by the first processor of the first system;

said second processor extracting the availability indicator metadata from the received e-mail; and said second processor storing the availability indicator metadata.

11. The computer system of claim 10, said method further comprising:

said second processor comparing the current date with a pre-selected date, wherein the pre-selected date is selected from the group consisting of the start date, the end date, a date in response to the start date, and a date in response to the end date;

said second processor determining from said comparing that the current date matches the preselected date; and in response to said determining that the current date matches the preselected date, said second processor notifying the receiver that the current date matches the preselected date, said notifying being performed using a pre-selected date graphical user interface.

12. The computer system of claim 9, said method further comprising:

defining the availability indicator, said defining being performed by a vacation planner through use of the first processor.

13. The computer system of claim 11, wherein the pre-selected date is the start date.

14. The computer system of claim 11, wherein the pre-selected date is the end date.

15. Storage media comprising a first hardware storage device having first program code stored therein, said first program code configured to be executed by a first processor of a first system to implement a method for transmitting availability information in an electronic mail system, said method comprising:

receiving, by the first processor of the first system from a user of the first system on a date prior to a start date, a notification that the user is unavailable from the start date to an end date;

in response to said receiving the notification, said first processor activating an availability indicator in the first system, wherein the availability indicator indicates that the user is unavailable from the start date to the end date;

said first processor extracting availability indicator metadata from the availability indicator, wherein the availability indicator metadata comprises the start date, the end date and an availability indicator message pertaining to the user being unavailable from the start date to the end date;

said first processor determining that an e-mail has not been sent from the first system to a receiver in a second system linked to the first system since said activating;

said processor ascertaining whether a current date is prior to the start date and determining, from said ascertaining, that the current date is prior to the start date;

in response to said determining that the current date is prior to the start date and to said determining that the e-mail has not been sent from the first system to the receiver in the second system, said first processor attaching the extracted availability indicator metadata to the e-mail; and said first processor sending the e-mail with the attached availability indicator metadata to the receiver in the second system.

16. The storage media of claim 15, said storage media further comprising a second hardware storage device having second program code stored therein, said second program code configured to be executed by a second processor of the second system to implement said method for transmitting availability information, said method further comprising:

said second processor receiving the e-mail with the attached availability indicator metadata sent by the first processor of the first system;

said second processor extracting the availability indicator metadata from the received e-mail; and said second processor storing the availability indicator metadata.

17. The storage media of claim 16, said method further comprising:

said second processor comparing the current date with a pre-selected date, wherein the pre-selected date is selected from the group consisting of the start date, the end date, a date in response to the start date, and a date in response to the end date;

said second processor determining from said comparing that the current date matches the preselected date; and in response to said determining that the current date matches the preselected date, said second processor notifying the receiver that the current date matches the preselected date, said notifying being performed using a pre-selected date graphical user interface.

18. The storage media system of claim 15, said method further comprising:

defining the availability indicator, said defining being performed by a vacation planner through use of the first processor.

19. The storage media of claim 17, wherein the pre-selected date is the start date.

20. The storage media of claim 17, wherein the pre-selected date is the end date.

* * * * *

Disclaimer and Dedication

9,547,842 — Jan De la Rosa, Austin, TX (US); Salil P. Gandhi, Pune (IN); Saidas T. Kottawar, Pune (IN); Sandip D. Mahajan, Pune (IN). OUT-OF-OFFICE ELECTRONIC MAIL MESSAGING SYSTEM. Patent dated January 17, 2017. Disclaimer filed March 1, 2017, by the assignee, International Business Machines Corporation.

Hereby disclaim and dedicate to the public complete claims 1-20, all claims of said patent.

*(Official Gazette, April 4, 2017)*